(12) United States Patent
Otsuka

(10) Patent No.: US 8,651,672 B2
(45) Date of Patent: Feb. 18, 2014

(54) PROJECTOR

(75) Inventor: Shingo Otsuka, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 335 days.

(21) Appl. No.: 13/159,863

(22) Filed: Jun. 14, 2011

(65) Prior Publication Data

US 2011/0310351 A1 Dec. 22, 2011

(30) Foreign Application Priority Data

Jun. 22, 2010 (JP) ................................ 2010-141385

(51) Int. Cl.
- *G03B 21/14* (2006.01)
- *G03B 21/22* (2006.01)
- *G02F 1/1333* (2006.01)

(52) U.S. Cl.
USPC ........................................... 353/119; 349/58

(58) Field of Classification Search
USPC ............... 353/119, 20, 30, 31; 349/56, 58, 5, 349/7–10; 359/485.05
See application file for complete search history.

(56) References Cited

U.S. PATENT DOCUMENTS

| | | | |
|---|---|---|---|
| 2006/0044515 A1* | 3/2006 | Suzuki | ............................ 353/20 |
| 2009/0002824 A1* | 1/2009 | Corn | ............................. 359/511 |
| 2009/0040464 A1 | 2/2009 | Utagawa | |

FOREIGN PATENT DOCUMENTS

| | | |
|---|---|---|
| JP | A-2009-042262 | 2/2009 |
| JP | A-2009-169042 | 7/2009 |

* cited by examiner

*Primary Examiner* — William C Dowling
*Assistant Examiner* — Ryan Howard
(74) *Attorney, Agent, or Firm* — Oliff PLC

(57) ABSTRACT

A projector includes: a reflection type polarization plate; a reflection type light modulation device; a light transmissive component; a support body; an optical compensation element disposed within the support body; and a control member which supports the optical compensation element, wherein any one of the first side surface, the second side surface, and the third side surface has a concave portion concaved toward the inside of the support body to accommodate the control member, the control member has an operation section which controls the position of the optical compensation element around a predetermined axis, and an operation notch through which the operation section projects to the outside of the support body is formed on the side wall of the concave portion.

4 Claims, 6 Drawing Sheets

PROJECTOR

BACKGROUND

1. Technical Field

The present invention relates to a projector.

2. Related Art

A projector which includes an optical compensation element disposed on the light entrance side or on the light exit side of a light modulation device for increasing the contrast of a projection image is known (for example, see JP-A-2009-169042).

The technology disclosed in JP-A-2009-169042 uses a transmission type liquid crystal panel as the light modulation device.

According to this structure, the optical compensation element is so arranged as to be rotatable (the posture thereof is controllable) by a compensation element control mechanism around a rotation axis perpendicular to the optical axis of entering light and inclined to the vertical direction and the horizontal direction of the liquid crystal panel.

The compensation element control mechanism has a plate-shaped frame unit for supporting the optical compensation element, and a support holder for supporting the frame unit in such a condition that the frame unit can rotate.

The support holder has a plate-shaped first junction, a pair of side walls projecting toward the light exit side from the edges of the first junction opposed to each other, and a pair of second junctions projecting in such directions as to approach each other from the respective distal ends of the pair of the side walls.

The frame unit is inserted into a space between the first junction and the pair of the second junctions, and supported by the support holder in such a condition as to be rotatable with respect to the support holder around the rotation axis.

According to the technology shown in JP-A-2009-169042, the contrast of the projection image can be set at a desired level by the posture control of the optical compensation element. However, since the light entrance surface and the light exit surface of the light modulation device are exposed to the outside, adhesion of dust or the like to this light entrance or exit surface may occur. In case of adhesion of dust or the like to the light entrance or exit surface of the light modulation device, there is a possibility that the shadow of the dust or the like is produced on the projection image. In this case, projection of a high-quality image is difficult to be achieved.

SUMMARY

An advantage of some aspects of the invention is to provide a projector capable of projecting a high-quality image.

A projector according to an aspect of the invention includes: a reflection type polarization plate which polarizes and separates entering light; a reflection type light modulation device which modulates entering light; a light transmissive component which transmits entering light; a support body which has a first side surface, a second side surface, and a third side surface to which being attached the reflection type polarization plate, the reflection type light modulation device, and the light transmissive component, and has a substantially sealed space between the reflection type polarization plate, the reflection type light modulation device, and the light transmissive component; an optical compensation element disposed within the support body; and a control member which supports the optical compensation element. Any one of the first side surface, the second side surface, and the third side surface has a concave portion concaved toward the inside of the support body to accommodate the control member. The control member has an operation section which controls the position of the optical compensation element around a predetermined axis. An operation notch through which the operation section projects to the outside of the support body is formed on the side wall of the concave portion.

According to this structure, the light modulation device is constituted by the reflection type light modulation device. The reflection type light modulation device and other components provided as the reflection type polarization plate and the light transmissive component are attached to the corresponding side surfaces of the support body. In this case, the reflection surface (image display surface) of the reflection type light modulation device is disposed inside the support body in the area as a substantially sealed space.

Thus, adhesion of dust or the like to the reflection surface of the reflection type light modulation device is avoided. Accordingly, the shadow of the dust or the like is not produced in the projection image.

In addition, any one of the side surfaces of the support body has the concave portion accommodating the optical compensation element and the control member.

In this case, a part of the operation notch can be closed when any of the reflection type polarization plate, the reflection type light modulation device, and the light transmissive component is attached to the side surface of the support body in such a manner as to close the concave portion. Thus, a sufficient degree of sealing for the support body can be secured.

The control member has the operation section, and is accommodated in the concave portion in such a condition that the operation section can project to the outside of the support body via the operation notch.

In this arrangement, the posture of the optical compensation element can be controlled such that the contrast of the projection image becomes a desired level by rotating the control member through operation of the operation section from the outside of the support body even when the reflection type polarization plate, the reflection type light modulation device, the light transmissive component, and the optical compensation element are attached to the support body.

Accordingly, the structure of this aspect can achieve projection of a high-quality image, and thus can provide the above-mentioned advantage of the invention.

When the structure disclosed in JP-A-2009-169042 is applied to the support body, the following problems arise.

According to the structure shown in JP-A-2009-169042, the support body has a pair of side walls projecting in directions opposed to each other from any one of the side surfaces of the support body, and a pair of second junctions projecting in such directions as to approach each other from the respective distal ends of the pair of the side walls. The control member is inserted into a space between the one side surface and the pair of the second junctions.

When this structure is adopted, a sufficient level of sealing for the support body is difficult to be secured. In this case, complicated structure is required for the support body when the posture of the optical compensation element is made adjustable with a sufficient level of sealing for the support body.

According to the structure of this aspect of the invention, however, the posture of the optical compensation element can be controlled with a sufficient degree of sealing only by providing the operation notch on a part of the side wall of the concave portion formed on any one of the side surfaces of the support body. Thus, the structure of the support body can be simplified.

It is preferable that the control member of the projector of the above aspect has a pair of arms projecting in directions away from each other in the plan view. In this case, a pair of fixing notches through each of which the corresponding one of the pair of the arms projects to the outside of the support body are formed on the side wall of the concave portion.

According to this structure, the operation section and the pair of the arms of the control member project to the outside of the support body via the operation notch and the pair of the fixing notches.

In this case, the control member can be fixed to three points of the support body when the operation section and the pair of the arms projecting to the outside of the support body are secured to the support body by adhesives or the like, for example, after control of the posture of the optical compensation element. Therefore, the desired posture of the optical compensation element can be maintained in a preferable condition.

Moreover, when any of the reflection type polarization plate, the reflection type light modulation device, and the light transmissive component is attached to the side surface of the support body in such a manner as to close the concave portion, a part of the pair of the fixing notches as well as the operation notch can be closed. Accordingly, a sufficient level of sealing for the support body can be secured.

It is preferable that the pair of the arms of the projector of the above aspect engage with the outer surface of the support body. In this case, the control member is attached at the respective engagement positions between the pair of the arms and the outer surface of the support body in such a condition as to be rotatable with respect to the support body around the predetermine axis.

According to this structure, the support structure for supporting the control member in such a condition that the control member can rotate is provided not inside the concave portion but on the outer surface of the support body. In this arrangement, the support body can be more easily manufactured than in the case in which the support structure is disposed inside the concave portion.

It is preferable that the projector of the above aspect satisfies the following points. The outer surface of the support body has a pair of support surfaces extending in parallel with each other in the plan view. A pair of projection pins projecting in directions away from each other in the plan view are provided in such positions that each of the projection pins is disposed on the corresponding one of the pair of the support surfaces. Each of the pair of the arms has an axial portion opposed to the corresponding one of the pair of the support surfaces. Each of the pair of the axial portions has a hole through which the corresponding one of the pair of the projection pins is inserted. When a length between the tip of one of the pair of the projection pins and the support surface on which the other projection pin is provided, a length between the pair of the axial portions, and a length between the pair of the support surfaces are L1, L2, and L3, respectively, the relationship between the pair of the support surfaces, the pair of the projection pins, and the pair of the axial portions is determined as L1>L2>L3.

According to this structure, the respective lengths L2 and L3 are so determined as to satisfy the above relationship. In this case, a clearance is produced between the support surfaces and the corresponding axial portions when the projection pins are inserted through the holes, in which condition the control member can rotate around the axis connecting the holes.

Moreover, by determining the relationship between the lengths L1 and L2 as above, the projection pins can be kept inserted through the holes during rotation of the control member while the control member is kept rotatable. Thus, separation of the control member from the projection pins can be prevented.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
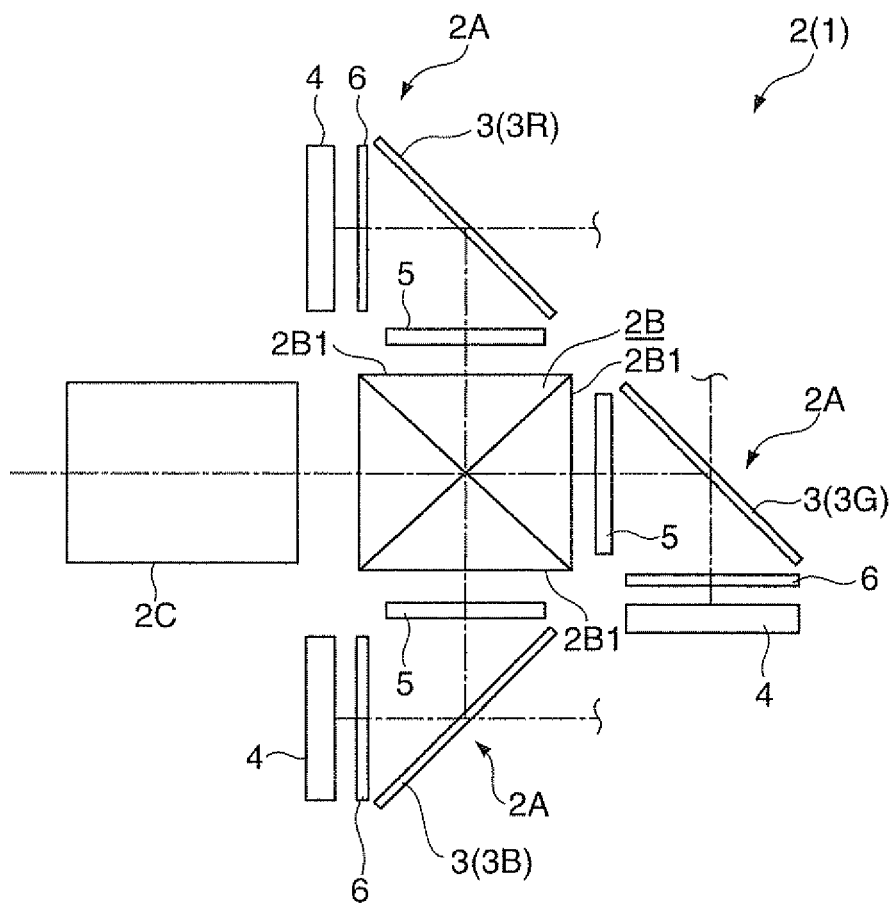
FIG. 1 illustrates the general structure of a projector according to an embodiment.

An embodiment according to the invention is hereinafter described with reference to the drawings.
Structure of Projector FIG. 1 illustrates the general structure of a projector 1. More specifically, FIG. 1 schematically illustrates an optical system of a projection unit 2 as the main part of the invention.

The projector 1 projects an image on a screen (not shown) for display of a projection image thereon.

As illustrated in FIG. 1, the projector 1 includes the projection unit 2 accommodated in an external housing (not shown).

The projection unit 2 modulates color lights in R (red), G (green), and B (blue) emitted from a light source device (not shown) and separated by a color separation device (not shown) such as a dichroic mirror, combines the modulated color lights, and projects the combined light.

Figure 2:
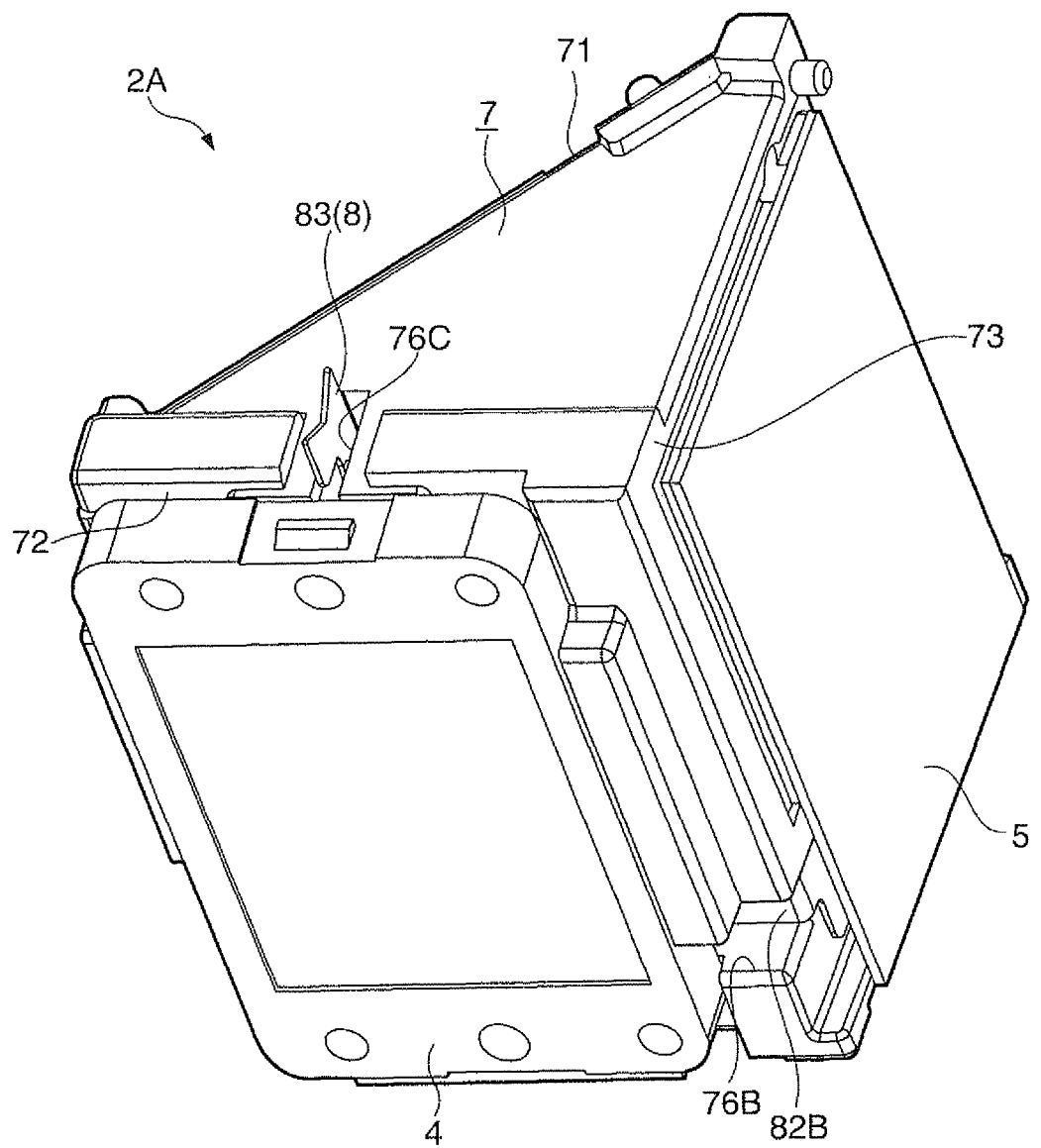
FIG. 2 illustrates the structure of a modulation unit according to the embodiment.
Figure 3:
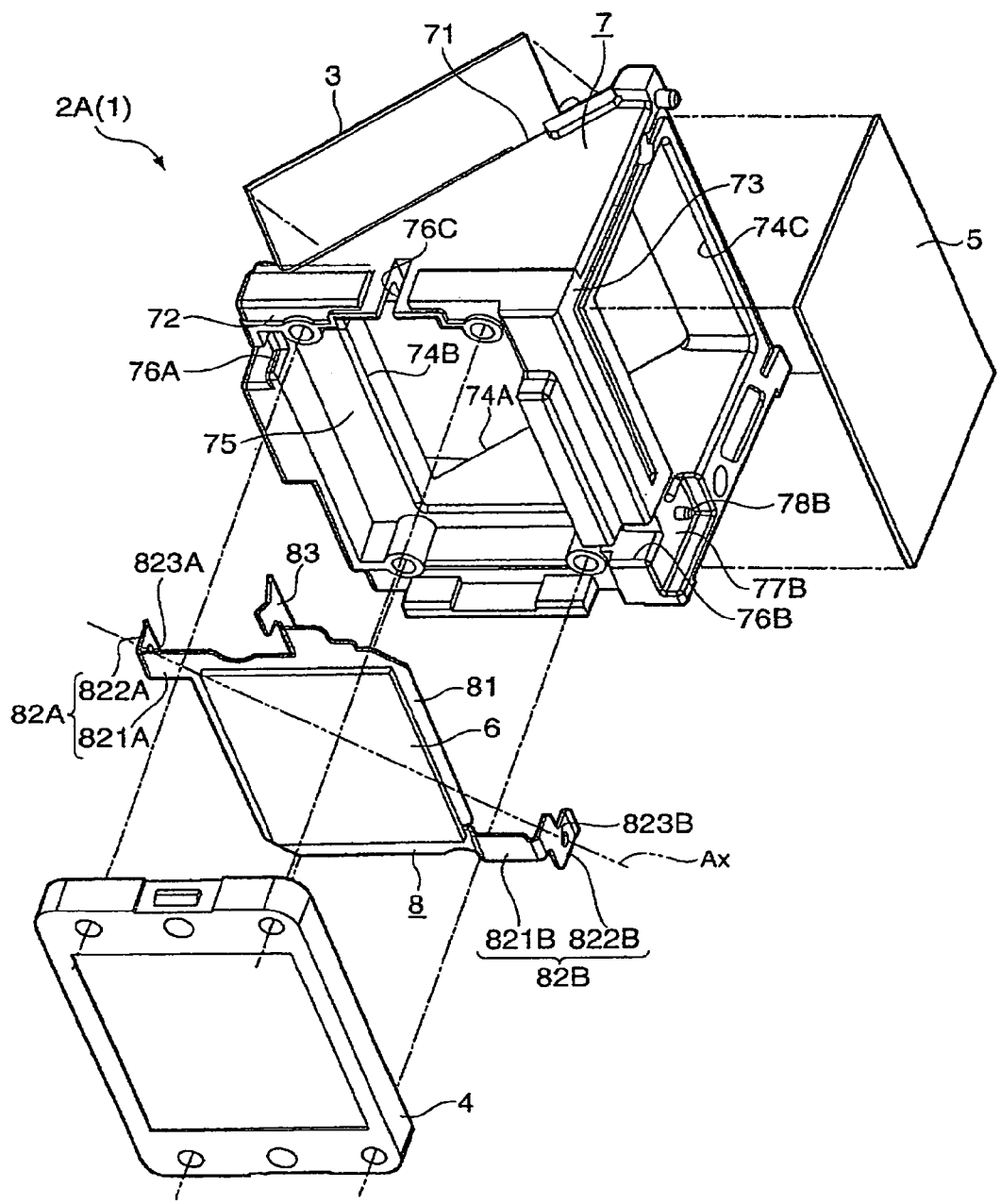
FIG. 3 illustrates the structure of the modulation unit according to the embodiment.

As illustrated in FIG. 1, the projection unit 2 has three modulation units 2A, a cross dichroic prism 2B as a color combining device, and a projection lens 2C.
Structure of Modulation Unit FIGS. 2 and 3 illustrate the structure of an example of the modulation units 2A. More specifically, FIG. 2 is a perspective view of the modulation unit 2A, and FIG. 3 is a perspective view of the disassembled modulation unit 2A.

As illustrated in FIGS. 1 through 3, the three modulation units 2A are similarly constructed, each of which has a wire grid 3 (FIGS. 1 and 3) as a reflection type polarization plate, a reflection type light modulation device 4, a polarization plate 5 as a light transmissive board, an optical compensation element 6 (FIGS. 1 and 3), a support body 7 (FIGS. 2 and 3), and a control member 8 (FIGS. 2 and 3).

In the following description, the wire grids for R light, G light, and B light are referred to as wire grids 3R, 3G, and 3B, respectively, for convenience of explanation (FIG. 1).
Structure of Wire Grid The wire grid 3 separates entering light into different types of polarized lights by diffraction based on its grid structure. As illustrated in FIGS. 1 and 3, the wire grid 3 is supported by the support body 7 in such a position as to be inclined to the optical axis of entering light substantially at 45 degrees.

The wire grid 3 transmits predetermined polarized light (first linearly polarized light) included in the entering light and reflects polarized light having the polarization direction perpendicular to the polarization direction of the first linearly polarized light (second linearly polarized light) to separate the entering light into different types of polarized lights.

Structure of Reflection Type Light Modulation Device

The reflection type light modulation device 4 includes a reflection type liquid crystal panel which has so-called LCOS (liquid crystal on silicon) structure containing liquid crystals on a silicon substrate. As illustrated in FIGS. 1 through 3, the reflection type light modulation device 4 is supported by the support body 7 in such a position as to cross the optical axis of the light having passed through the wire grid 3 substantially at right angles.

When receiving a signal transmitted from a controller (not shown) for controlling the orientation condition of the liquid crystals, the reflection type light modulation device 4 modulates the polarization direction of the polarized light having passed through the wire grid 3 (phase modulation) in accordance with the received signal and reflects the modulated light toward the wire grid 3. Then, only the polarized light having the polarization direction perpendicular to the polarization direction of the first linearly polarized light (second linearly polarized light) after modulated by the reflection type light modulation device 4 and reflected thereby toward the wire grid 3 is reflected by the wired grid 3 toward the prism 2B.

Structure of Polarization Plate

The polarization plate 5 transmits the polarized light having substantially the same polarization direction as the polarization direction of the second linearly polarized light modulated by the reflection type light modulation device 4 and reflected by the wire grid 3. Thus, by the functions of both the wire grid 3 and the polarization plate 5, a polarization component other than the desired linearly polarized light can be removed by the polarization plate 5 even when this polarization component is reflected by the wire grid 3.

As illustrated in FIGS. 1 through 3, the polarization plate 5 is supported by the support body 7 in such a position as to be opposed to a light entrance surface 2B1 (FIG. 1) of the prism 2B.

As illustrated in FIG. 1, the prism 2B has the three light entrance surfaces 2B1 receiving the respective color lights having passed through the corresponding polarization plates 5 to combine the received color lights.

The prism 2B has a substantially square shape in the plan view formed by four rectangular prisms affixed to each other, and includes two dielectric multilayer films on the interfaces of the affixed rectangular prisms. The dielectric multilayer films transmit the G light reflected by the wire grid 3G, and reflect the R and B lights reflected by the wire grids 3R and 3B. By this method, the respective color lights are combined, and the resultant light (image) combined by the prism 2B is projected toward the screen through the projection lens 2C.

Structure of Optical Compensation Element

The optical compensation element 6 is a plate-shaped component made of inorganic or organic material having double refraction, a plate-shaped component made of a composite of these materials, or a WV (wide view) film, attached to a transparent plate made of glass, plastic, or other polymers, for example. The optical compensation element 6 performs fine adjustment of the degree of phase modulation after the modulation by the reflection type light modulation device 4 which still contains inaccurate modulation so as to increase the contrast of the projection image.

As illustrated in FIGS. 1 through 3, the optical compensation element 6 is accommodated in the support body 7 in such a position as to face to the reflection type light modulation device 4.

Structure of Support Body

The support body 7 supports the wire grid 3, the reflection type light modulation device 4, the polarization plate 5, and the optical compensation element 6.

As illustrated in FIGS. 2 and 3, the support body 7 is a hollow triangle-pole-shaped component having a substantially isosceles right-angled triangular cross section, and has a first side surface 71 as a slope, and a second side surface 72 and a third side surface 73 forming the vertical angle.

As illustrated in FIG. 3, the first side surface 71 and the third side surface 73 has openings 74A and 74C, respectively, each of which has a rectangular shape in the plan view and connects the inside and outside of the support body 7.

The wire grid 3 and the polarization plate 5 are fixed to the first side surface 71 and the third side surface 73, respectively, in such a manner as to close the respective openings 74A and 74C formed thereon.

As illustrated in FIG. 3, the second side surface 72 has a concave portion 75 having a substantially rectangular shape in the plan view and concaved toward the inside.

An opening 74B having a rectangular shape in the plan view and connecting the inside and outside of the support body 7 is formed on a part of the bottom of the concave portion 75.

A first fixing notch 76A and a second fixing notch 76B connecting the inside and outside of the concave portion 75 in the left-right direction are formed on the upper left part and the lower right part, respectively, of side wall of the concave portion 75 as viewed in FIG. 3.

The outside surface of the support body 7 has a first support surface 77A (see FIG. 4A) and a second support surface 77B (see FIGS. 3 and 4B) located adjacent to the fixing notches 76A and 76B, respectively, and extending in directions parallel with the third side surface 73.

A first projection pin 78A (see FIG. 4A) and a second projection pin 78B (see FIGS. 3 and 4B) each of which has a substantially cylindrical shape and projects in a direction substantially perpendicular to the third side surface 73 are provided on the support surfaces 77A and 77B, respectively.

As illustrated in FIGS. 2 and 3, an operation notch 76C connecting the inside and outside of the concave portion 75 in the up-down direction is formed on the upper part of the side wall of the concave portion 75 as viewed in FIG. 3.

The reflection type light modulation device 4 is fixed to the second side surface 72 in such a condition as to close the concave portion 75 accommodating the optical compensation element 6 and the control member 8.

According to this structure, the respective openings 74A through 74C are closed by the corresponding components 3 through 5 to produce a substantially sealed space inside the support body 7.

Structure of Control Member

The control member 8 engages with the support body 7 while supporting the optical compensation element 6. The control member 8 is used for controlling the posture of the optical compensation element 6.

As illustrated in FIG. 3, the control member 8 is formed by sheeting into a component having a first arm 82A, a second arm 82B, and an operation section 83 formed integrally with a base body 81.

The base body 81 is a plate having a substantially rectangular shape in the plan view. An opening (not shown) through which light passes is formed substantially at the center of the base body 81, and the optical compensation element 6 is fixed to the base body 81 in such a position as to close the opening of the base body 81.

Figure 4A:
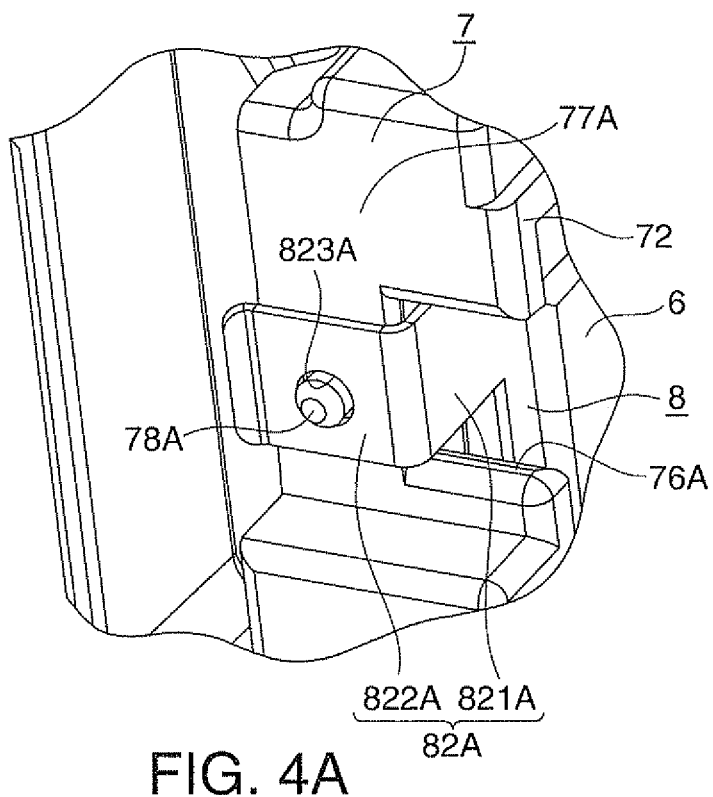
FIGS. 4A and 4B illustrate an engagement structure between a support body and a control member according to the embodiment.
Figure 4B:
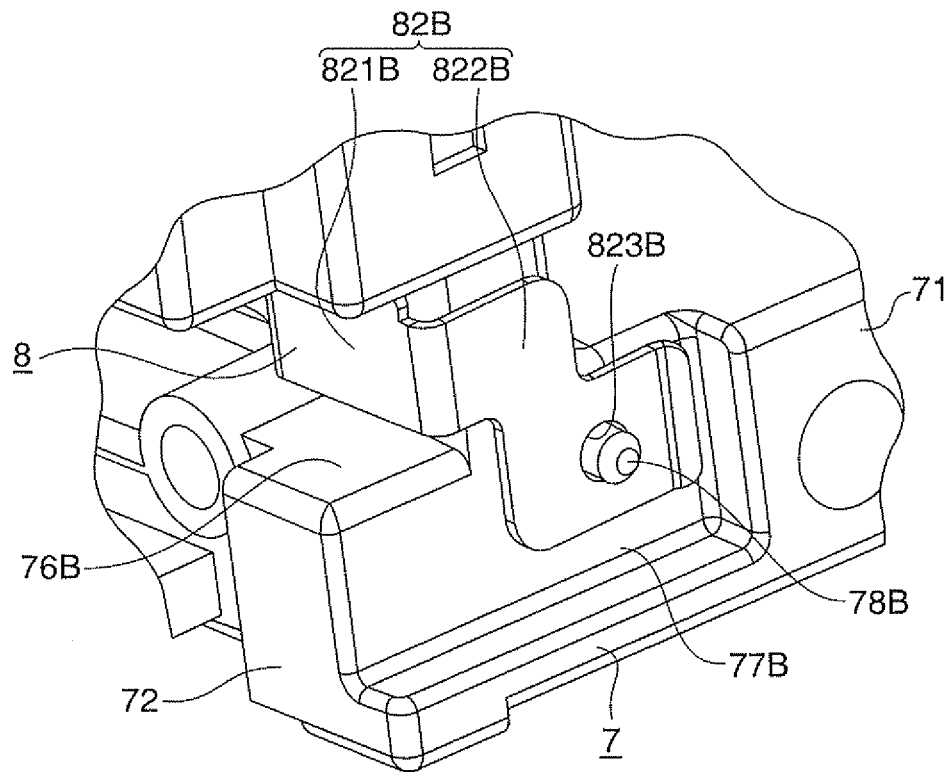

FIGS. 4A and 4B illustrate the engaging structure between the support body 7 and the control member 8. More specifically, FIG. 4A is a perspective view of an enlarged area containing the first support surface 77A, while FIG. 4B is a perspective view of an enlarged area containing the second support surface 77B.

Figure 6A:
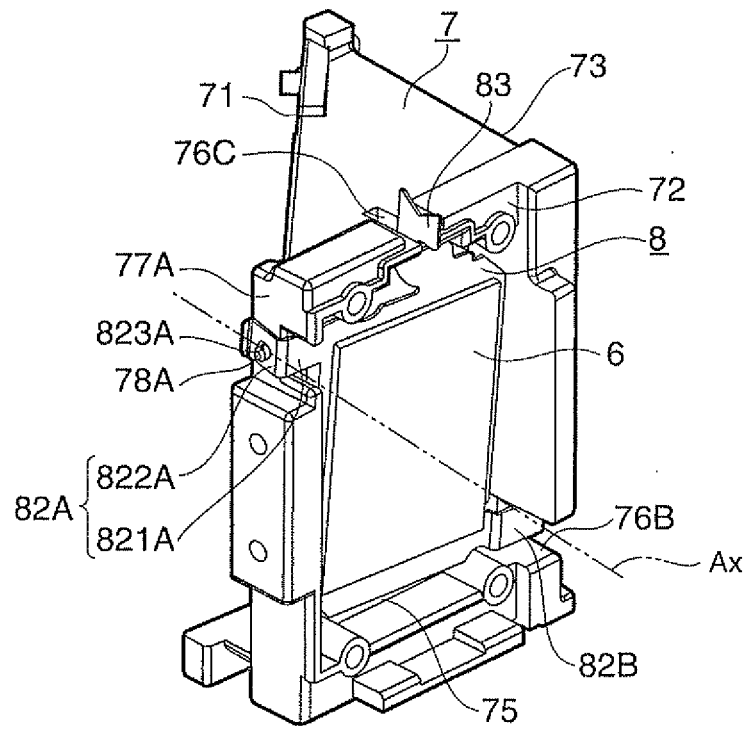
FIGS. 6A and 6B illustrate posture control of an optical compensation element according to the embodiment.
Figure 6B:
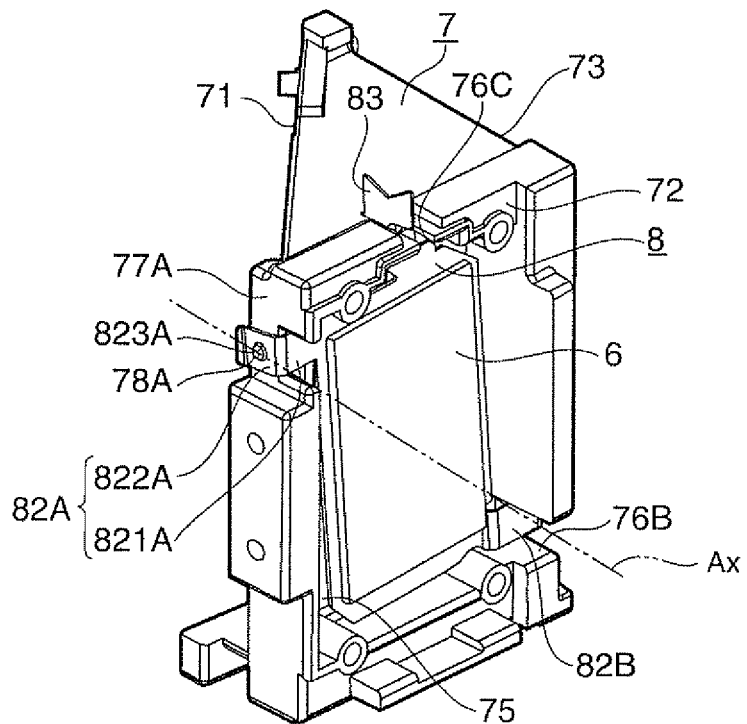

The first arm 82A and the second arm 82B are supported in such a manner as to be rotatable with respect to the support body 7 around a rotation axis Ax (see FIGS. 3, 6A and 6B).

The first arm 82A projects from the inside of the concave portion 75 of the support body 7 to the outside via the first fixing notch 76A when the control member 8 is accommodated in the concave portion 75, and has a first extended portion 821A and a first axial portion 822A as illustrated in FIG. 3.

The first extended portion 821A extends from the upper left edge of the base body 81 as viewed in FIG. 3 along the plate surface of the base body 81 toward the left.

The first axial portion 822A is a portion formed by bending the distal end of the first extended portion 821A substantially at 90 degrees, and has a first round hole 823A penetrating from the front side to the rear side of the first axial portion 822A.

As illustrated in FIG. 4A, the first arm 82A projects from the inside of the concave portion 75 to the outside through the first fixing notch 76A with the first axial portion 822A facing to the first support surface 77A, and engages with the support body 7 by insertion of the first projection pin 78A through the first round hole 823A.

The second arm 82B is provided at the lower right edge of the base body 81 as viewed in FIG. 3. As illustrated in FIGS. 3 and 4B, the second arm 82B has a second extended portion 821B and a second axial portion 822B (including a second round hole 823B) substantially similar to the first extended portion 821A and the first axial portion 822A (including the first round hole 823A) of the first arm 82A.

As illustrated in FIG. 4B, the second arm 82B projects from the inside of the concave portion 75 to the outside through the second fixing notch 76B with the second axial portion 822B facing to the second support surface 77B, and engages with the support body 7 by insertion of the second projection pin 78B through the second round hole 823B.

Figure 5:
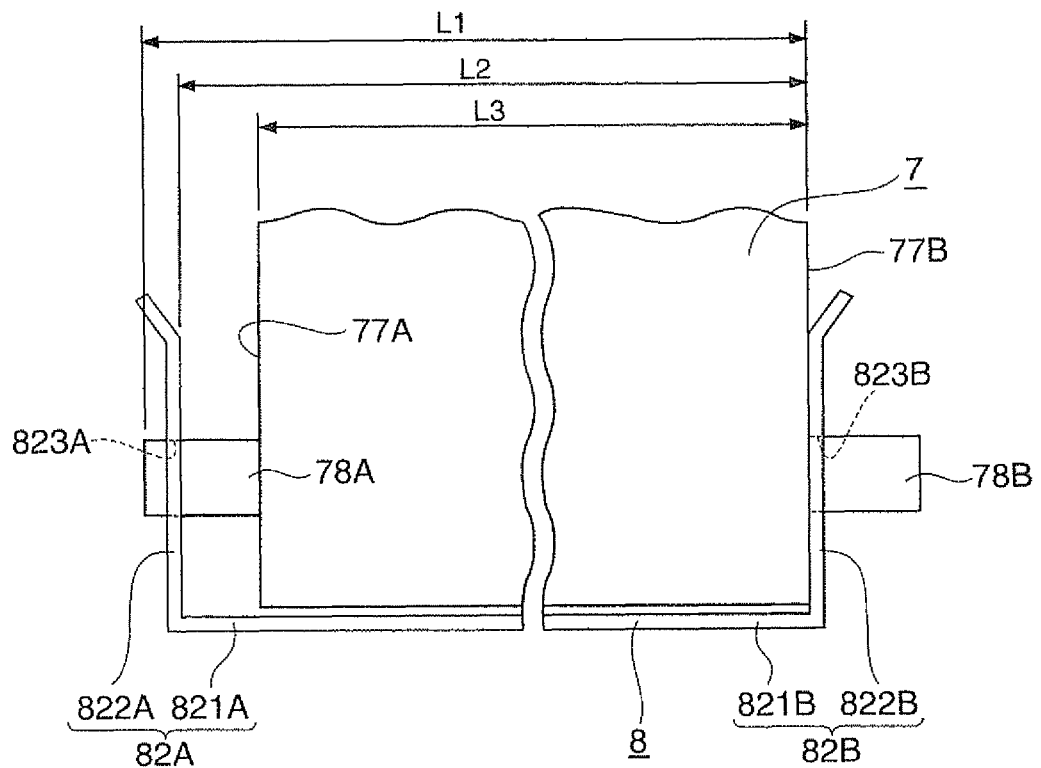
FIG. 5 illustrates the positional relationship between support surfaces, projection pins, and axial portions according to the embodiment.

FIG. 5 illustrates the positional relationship between the support surfaces 77A and 77B, the projection pins 78A and 78B, and the axial portions 822A and 822B. More specifically, FIG. 5 schematically illustrates the engagement structure between the support body 7 and the control member 8 as viewed from above in FIG. 3.

The positional relationship between the support surfaces 77A and 77B, the projection pins 78A and 78B, and the axial portions 822A and 822B is set as follows.

As illustrated in FIG. 5, a length L1 between the tip of either the projection pin 78A or 78B (first projection pin 78A in the example shown in FIG. 5) and the support surface where the other projection pin is provided (second support surface 77B in the example shown in FIG. 5) in the plan view as viewed from above in FIG. 3 is larger than a length L2 between the axial portions 822A and 822B.

In addition, as illustrated in FIG. 5, the length L2 is larger than a length L3 between the support surfaces 77A and 77B.

When the relationship between the respective lengths L1 through L3 is determined as L1>L2>L3, a clearance is produced between the axial portion 822A and the support surface 77A and between the axial portion 822B and the support surface 77B. Thus, the control member 8 supported by the support body 7 can rotate with respect to the support body 7 around the line connecting the respective round holes 823A and 823B (rotation axis Ax).

According to this embodiment, the rotation axis Ax is inclined to the vertical direction and the horizontal direction of the rectangular reflection surface of the reflection type light modulation device 4 in the plan view as viewed in the direction of light entrance into the reflection type light modulation device 4.

The operation section 83 is a portion to be operated by an operator from the outside of the support body 7.

The operation section 83 is a plate-shaped component crossing the second side surface 72 at right angles and extended upward from the upper edge of the base body 81 as viewed in FIG. 3.

As illustrated in FIG. 2, the operation section 83 projects from the inside of the concave portion 75 of the support body 7 to the outside via the operation notch 76C when the control member 8 is accommodated in the concave portion 75.

Modulation Unit Manufacturing Method

A method for manufacturing the modulation unit 2A is now explained.

FIGS. 6A and 6B illustrate the method for manufacturing the modulation unit 2A.

FIGS. 6A and 6B do not show the reflection type light modulation device 4 for convenience of explanation.

Initially, the operator fixes the wire grid 3 and the polarization plate 5 to the first side surface 71 and the third side surface 73 of the support body 7, respectively. Then, after fixing the optical compensation element 6 to the control member 8, the operator inserts the control member 8 into the concave portion 75 with engagement between the respective arms 82A and 82B and the projection pins 78A and 78B, and fixes the reflection type light modulation device 4 to the second side surface 72.

Under this condition, the operator allows the light source device (not shown) to emit light for posture control toward the wire grid 3.

Then, the operator controls the posture of the optical compensation element 6 in the manner described below such that the contrast of the projection image modulated by the reflection type light modulation device 4 and projected on the screen after passing through the wire grid 3, the polarization plate 5, and the projection lens 2C becomes the maximum while checking the projection image on the screen.

For the posture control, as illustrated in FIGS. 6A and 6B, the operator operates the operation section 83 projecting to the outside of the support body 7 via the operation notch 76C such that the operation section 83 shifts in the direction perpendicular to the second side surface 72 to rotate the control member 8 (optical compensation element 6) around the rotation axis Ax.

Then, the operator determines the position of the optical compensation element 6 where the contrast of the projection image becomes the maximum (the direction of the optical axis of the optical compensation element 6 becomes appropriate for the material and the orientation condition of the liquid crystals of the reflection type light modulation device 4) by rotating the optical compensation element 6, and fixes the control member 8 to the support body 7 in the manner as follows.

For fixing the control member 8 to the support body 7, the operator fills the clearance between the operation notch 76C and the operation section 83, the clearances between the projection pins 78A and 78B and the round holes 823A and 823B, and the clearances between the support surfaces 77A and 77B and the axial portions 822A and 822B with adhesives, and allows the adhesives to harden.

After completion of these steps, the process of manufacturing the modulation unit 2A ends.

According to this embodiment, the following advantages can be offered.

In this embodiment, each of the light modulation devices is constituted by the reflection type light modulation device 4. The wire grid 3, the reflection type light modulation device 4, and the polarization plate 5 are attached to the side surfaces 71 through 73 of the support body 7, respectively. In this arrangement, the reflection surface (image display surface) of the reflection type light modulation device 4 is disposed inside the support body 7 in the area as a substantially sealed space.

Thus, adhesion of dust or the like to the reflection surface of the reflection type light modulation device 4 is avoided. Accordingly, the shadow of the dust or the like is not produced in the projection image.

The second side surface 72 has the concave portion in which the optical compensation element 6 and the control member 8 are accommodated.

According to this structure, a part of the operation notch 76C can be closed when the reflection type light modulation device 4 is attached to the second side surface 72 in such a manner as to close the concave portion 75. Thus, a sufficient degree of sealing for the support body 7 can be secured.

The control member 8 has the operation section 83, and is accommodated in the concave portion 75 in such a condition that the operation section 83 can project to the outside of the support body 7 via the operation notch 76C.

In this arrangement, the posture of the optical compensation element 6 can be controlled such that the contrast of the projection image becomes a desired level by rotating the control member 8 through operation of the operation section 83 from the outside of the support body 7 even when the respective components 3 through 6 are attached to the support body 7. Thus, the modulation unit 2A can be easily manufactured.

Moreover, the posture of the optical compensation element 6 can be controlled with a sufficient degree of sealing for the support body 7 only by providing the operation notch 76C on a part of the side wall of the concave portion 75 formed on the second side surface 72. Thus, the structure of the support body 7 can be simplified.

The operation section 83 and the arms 82A and 82B of the control member 8 project to the outside of the support body 7 via the operation notch 76C and the fixing notches 76A and 76B.

According to this structure, the control member 8 can be fixed to three points of the support body 7 by fixing the operation section 83 and the arms 82A and 82B to the support body 7 using adhesives after control of the posture of the optical compensation element G. Therefore, the desired posture of the optical compensation element 6 can be maintained in a preferable condition.

When the reflection type light modulation device 4 is attached to the second side surface 72 in such a manner as to close the concave portion 75, a part of the fixing notches 76A and 76B as well as the operation notch 76C can be closed. Accordingly, a sufficient level of sealing for the support body 7 can be secured.

The support structure (projection pins 78A and 78B) for supporting the control member 8 in such a condition that the control member 8 can rotate is provided not within the concave portion 75 but on the outer surface of the support body 7. In this arrangement, the support body 7 can be more easily manufactured than in the case in which the support structure is disposed within the concave portion 75.

The respective lengths L2 and L3 are determined such that the relationship between these lengths L2 and L3 becomes L2>L3. In this case, a clearance is produced between the support surface 77A and the axial portion 822A and between the support surface 77B and the axial portion 822B when the projection pins 78A and 783 are inserted through the round holes 823A and 823B, in which condition the control member 8 can rotate around the rotation axis Ax connecting the round holes 823A and 823B.

Moreover, by determining the relationship between the lengths L1 and L2 as L1>L2, the projection pins 78A and 78B can be kept inserted through the round holes 823A and 823B during rotation of the control member 8 while the control member 8 is kept rotatable. Thus, separation of the control member 8 from the projection pins 78A and 78B can be prevented.

The invention is not limited to the embodiment described and depicted herein but may be practiced otherwise without departing from the scope of the invention. For example, modifications and improvements including the following changes may be made.

According to this embodiment, the concave portion 75 is disposed on the second side surface 72. However, the concave portion 75 may be located on the first side surface 71 or the third side surface 73.

According to this embodiment, the support structure (projection pins 78A and 78B) for supporting the control member 8 in such a manner that the control member 8 can rotate is provided on the outer surface of the support body 7. However, the support structure may be positioned inside the concave portion 75 (on the side wall of the concave portion 75).

According to this embodiment, the pair of the arms 82A and 82B as well as the operation section 83 project to the outside of the support body 7. However, when the support structure is provided inside the concave portion as in the above case, for example, the pair of the arms 82A and 82B are not required to project to the outside of the support body 7, that is, the fixing notches 76A and 76B may be eliminated.

According to this embodiment, the polarization plate 5 is used as a light transmissive component. However, the light transmissive component may be of other types such as a component of glass as long as it has light transmissivity.

According to this embodiment, the rotation axis Ax is inclined to the vertical direction and the horizontal direction of the reflection surface of the reflection type light modulation device 4 in the plan view. However, the rotation axis Ax may extend in any direction determined in accordance with the material and the orientation condition of the liquid crystals of the reflection type light modulation device 4.

The modulation unit 2A may be manufactured by methods other than the method described in this embodiment.

For example, while the posture of the optical compensation element 6 is controlled with a check on the projection image on the screen in this embodiment, the posture may be adjusted by direct detection of light for posture control released from the polarization plate 5 using a CCD camera or the like.

According to this embodiment, the wire grid 3 is used as the reflection type polarization plate. However, the reflection type polarization plate may be of other types as long as they have the function of the reflection type polarization plate.

For example, the reflection type polarization plate may be a polarization separation element including dielectric multilayer film, a layered polymer polarization plate on which layers of organic material having refractive index anisotropy (double refraction) such as liquid crystal are laminated, an optical element as a combination of a ¼ wavelength plate and a circular polarization reflection plate which separates light having no polarization into circularly polarized light in the clockwise direction and circularly polarized light in the anticlockwise direction, an optical element which separates polarized light for reflection from polarized light for transmission based on Brewster's angle, or a hologram optical element using hologram.

The technology of the invention is applicable to a projector used for presentation, home theater, or for other purposes.

The present application claim priority from Japanese Patent Application No. 2010-1414385 filed on Jun. 22, 2010, which is hereby incorporated by reference in its entirety.

What is claimed is:

1. A projector comprising:
    a reflection type polarization plate which polarizes and separates entering light;
    a reflection type light modulation device which modulates entering light;
    a light transmissive component which transmits entering light;
    a support body which has a first side surface, a second side surface, and a third side surface to which being attached the reflection type polarization plate, the reflection type light modulation device, and the light transmissive component, and has a substantially sealed space between the reflection type polarization plate, the reflection type light modulation device, and the light transmissive component;
    an optical compensation element disposed within the support body; and
    a control member which supports the optical compensation element,
    wherein
    any one of the first side surface, the second side surface, and the third side surface has a concave portion concaved toward the inside of the support body to accommodate the control member,
    the control member has an operation section which controls the position of the optical compensation element around a predetermined axis,
    an operation notch through which the operation section projects to the outside of the support body is formed on the side wall of the concave portion,
    the control member has a pair of arms projecting in directions away from each other in the plan view; and
    a pair of fixing notches through each of which the corresponding one of the pair of the arms projects to the outside of the support body are formed on the side wall of the concave portion.

2. The projector according to claim 1, wherein
    the pair of the arms engage with the outer surface of the support body; and
    the control member is attached at the respective engagement positions between the pair of the arms and the outer surface of the support body in such a condition as to be rotatable with respect to the support body around the predetermine axis.

3. The projector according to claim 2, wherein
    the outer surface of the support body has a pair of support surfaces extending in parallel with each other in the plan view;
    a pair of projection pins projecting in directions away from each other in the plan view are provided in such positions that each of the projection pins is disposed on the corresponding one of the pair of the support surfaces;
    each of the pair of the arms has an axial portion opposed to the corresponding one of the pair of the support surfaces;
    each of the pair of the axial portions has a hole through which the corresponding one of the pair of the projection pins is inserted; and
    when a length between the tip of one of the pair of the projection pins and the support surface on which the other projection pin is provided, a length between the pair of the axial portions, and a length between the pair of the support surfaces are $L1$, $L2$, and $L3$, respectively, the relationship between the pair of the support surfaces, the pair of the projection pins, and the pair of the axial portions is determined as $L1 > L2 > L3$.

4. The projector according to claim 1, wherein the optical compensation element is rotatable about an axis perpendicular to an optical axis of entering light.

* * * * *